United States Patent [19]

Longuet et al.

[11] Patent Number: 5,215,171

[45] Date of Patent: Jun. 1, 1993

[54] LOAD CONTROLLED BRAKE COMPENSATOR WITH A RESTORING SPRING AND A LOCKING DEVICE ON A SLIDABLE ROD

[75] Inventors: Marc Longuet, Menars; Alain Perrin, Bobigny; Lionel Bourgois, Drancy, all of France

[73] Assignee: Bendix Europe Services Techniques, Drancy, France

[21] Appl. No.: 789,714

[22] Filed: Nov. 8, 1991

[30] Foreign Application Priority Data

Nov. 13, 1990 [FR]  France ................................. 90 14062

[51] Int. Cl.$^5$ ............................................. B60T 8/30
[52] U.S. Cl. ................................. 188/195; 303/22.5; 303/9.69; 303/22.8
[58] Field of Search ............... 188/195; 267/173–176; 303/9.69, 9.75, 9.76, 9.62, 22.1, 22.2, 22.8, 22.5

[56] References Cited

U.S. PATENT DOCUMENTS

| | | | |
|---|---|---|---|
| 4,639,048 | 1/1987 | Schopper et al. | 303/22.1 |
| 4,648,489 | 3/1987 | Schmoelzer | 188/195 |
| 4,707,036 | 11/1987 | Farr | 303/9.69 |
| 4,750,786 | 6/1988 | Adachi et al. | 303/22.1 |
| 4,915,457 | 4/1990 | Schopper | 303/22.8 |

FOREIGN PATENT DOCUMENTS

| | | | |
|---|---|---|---|
| 2647072 | 11/1990 | France | 188/195 |
| 0049573 | 3/1988 | Japan | 188/195 |

*Primary Examiner*—Matthew C. Graham
*Assistant Examiner*—Josie A. Ballato
*Attorney, Agent, or Firm*—Larry J. Palguta; Ken C. Decker

[57] ABSTRACT

A load-controlled brake compensator for a vehicle possessing a chassis and at least one axle, includes a fixed part (10) solidly attached to the chassis and comprising at least one compensating valve provided with a pivotingly mounted control lever (12) of which one end is associated with the axle via a preloaded spring device (18) whose length is preset by way of a temporary strut (22) before one of its ends (20) is fixed to the axle, the other end of the spring device being solidly attached to a rod (16) capable of sliding in an opening (14) made in the end of the lever (12). It further comprises an elastic mechanism (24) tending to restore the spring device (18) towards the lever and a locking means (28, 29, 30) allowing the sliding movement of the rod (16) in the opening (14) to be prevented after fixing of the spring device (18) to the axle and before removal of the temporary strut (22).

5 Claims, 1 Drawing Sheet

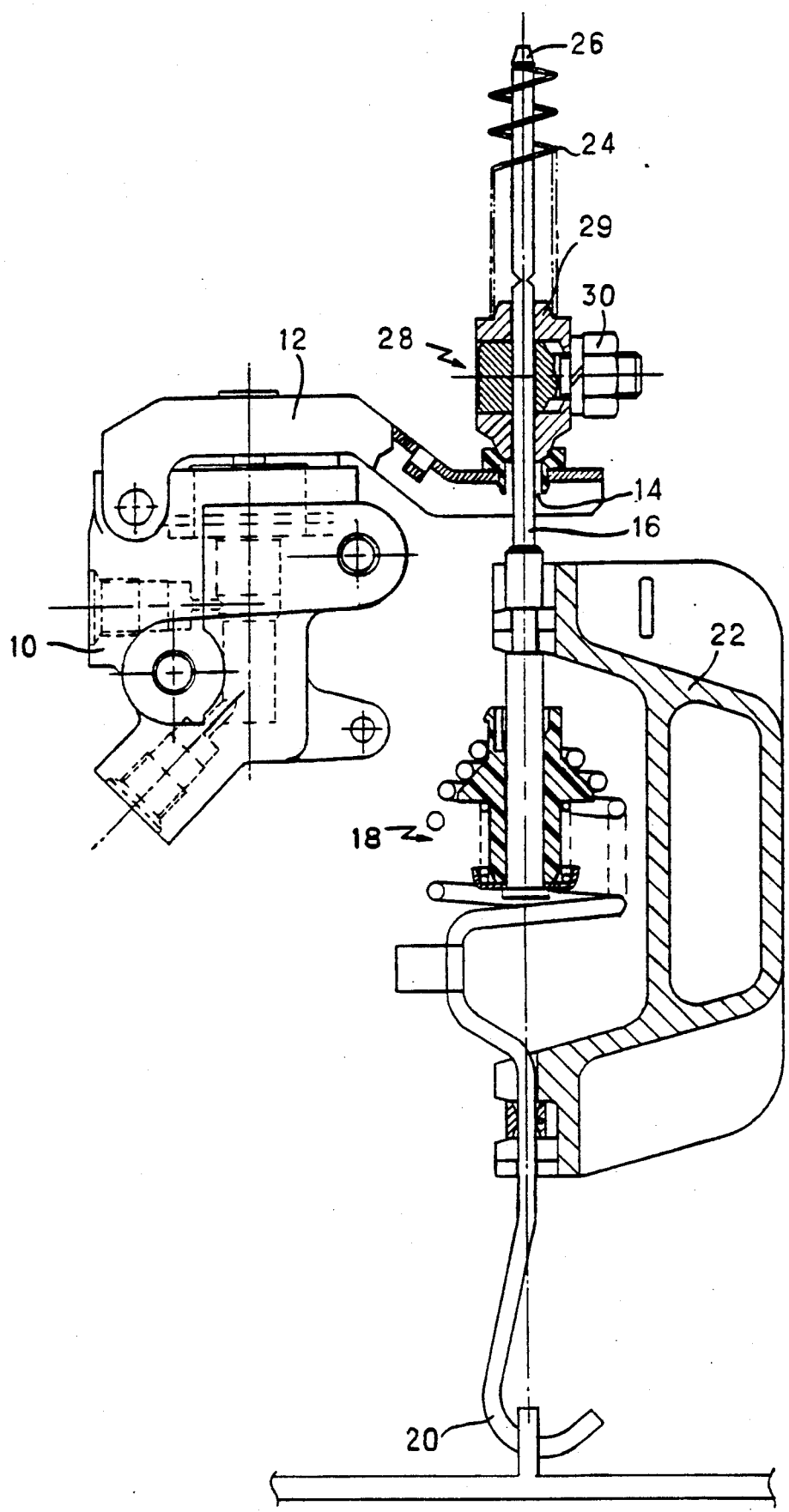

LOAD CONTROLLED BRAKE COMPENSATOR WITH A RESTORING SPRING AND A LOCKING DEVICE ON A SLIDABLE ROD

BACKGROUND OF THE INVENTION

The present invention concerns load-controlled brake compensators for motor vehicles allowing the division of braking between the front axle and the rear axle to be modified as a function of the load on the vehicle assisted in this way.

These brake compensators are well known to persons skilled in the art and their operating modes will not be described here. In a conventional manner, such a compensator includes a fixed part solidly attached to the chassis comprising at least one compensating valve provided with a pivotingly mounted control lever of which one end is associated with an axle via a preloaded spring device whose length is preset by means of a temporary strut before one of its ends is fixed to this axle, the other end of the spring device being solidly attached to a rod sliding in an opening made at the end of the lever.

Such a compensator is for example described in FR-A-2,564,397. This compensator, however, is slow and awkward to fit in place in the vehicle that it is to equip. This is because the end hook of the spring device has to be arranged in an appropriate eyelet before removal of the temporary strut and the distance between the end of the lever and the hook has to be such that there is no risk of the spring device shaking when the vehicle moves, especially when empty, and that the lever stays in the appropriate position with respect to the compensator valve. To this end, according to the above-mentioned document, the spring device ends in a threaded rod and, after positioning of the assembly on the vehicle and before removal of the temporary strut, a nut is screwed onto the rod until it immobilizes the assembly. This operation is difficult to carry out and cannot easily be automated.

SUMMARY OF THE INVENTION

The present invention has the object of obviating this disadvantage.

According to the invention, the compensator possesses an elastic means tending to restore the spring device towards the lever and a locking means allowing the sliding movement of the rod in the opening to be prevented after fixing of the spring device to the axle and before removal of the temporary strut.

Thus, by virtue of the invention, the spring device directly and automatically takes up its precise position with respect to the lever, the locking not requiring any difficult additional manipulation.

BRIEF DESCRIPTION OF THE DRAWINGS

The invention will now be described by way of example with reference to the accompanying drawing in which:

The single figure shows schematically and partially in section a compensator in accordance with the present invention.

DETAILED DESCRIPTION OF THE INVENTION

Now with reference to this figure, the compensator comprises a fixed part 10 attached to the vehicle chassis and comprising the usual brake pressure compensating valves shown by phantom lines. A control lever 12 pivotingly mounted on the part 10 allows the cutoff point of the compensating valves to be adjusted as a function of the loading of the vehicle.

The end of the lever 12 possesses an opening 14 through which passes a rod 16 solidly attached to a spring device 18 whose end 20 is constituted by a hook intended to be hooked (as shown) to an axle of the vehicle.

The spring device 18 is of the preloaded spring type whose length is preset by means of a temporary strut 22 during assembly of the compensator. This strut 22 is, obviously, removed when the compensator is fitted on a vehicle.

The rod 16 is capable of sliding in the opening 14, and an elastic means such as the helical spring 24 restores the spring device 18 towards to the lever 12. In the example shown, one end of this spring 24 is fixed to the free end 26 of the rod 16, while the other end of the spring bears indirectly on the lever 12.

A locking means 28 is provided to prevent the rod from sliding before removal of the temporary strut 22. The locking means is constituted here by a ring 29 provided with a clamping means 30 whose axis is perpendicular to that of the rod 16. This clamping means 30 is a screw cooperating with the ring 29 to grip the rod 16.

It will thus be understood that the positioning of this compensator on a vehicle is greatly eased with respect to that of the compensator in the aforementioned document.

In fact, the hooking of the hook 20 in the eyelet (not shown) provided on the axle of the vehicle does not present any problem because the rod 16 is able to slide. The elastic means 24 then automatically restores the assembly to the appropriate position without the necessity of turning a difficult nut in an area which is not very accessible to an operator. The assembly is then locked by virtue of the aforementioned easily accessible locking means 28.

Preferably, the part of the locking means 28 in contact with the lever 12 has a partially spherical form in order to improve the pivoting movement of the rod 16 about the lever 12 as is known in the art.

The person skilled in the art will clearly be able to apply numerous modifications to the invention without thereby leaving the scope of the accompanying claims.

For example, it may be desirable that the length of the inactive part of the rod 16 after the positioning of the compensator be reduced. In this case, a pre-cutout will be provided on the rod perpendicular to its axis. The positioning of the compensator will then possess a further final step during which the end 26 of the rod, which has become redundant, will be cut and the elastic means 24 will be removed.

What we claim is:

1. A load-controlled brake compensator for a vehicle possessing a chassis and at least one axis, said compensator including a fixed part solidly attached to said chassis and comprising at least one compensation valve provided with a pivotingly mounted control lever of which one end of said lever is associated with said axle via a preloaded spring device whose length is preset by means of a temporary strut before one end of said spring device is fixed to said axle, another end of said spring device being attached to a rod capable of sliding in an opening made in said one end of the lever, further comprising elastic means tending to restore said spring device toward said lever and locking means allowing the sliding movement of said rod in said opening to be prevented after connecting said spring device to said axle and before removal of said temporary strut, said elastic means comprising a helical spring one end of which is connected with a free end of said rod and the other end bearing on said locking means.

2. The compensator according to claim 1, wherein said locking means comprises a ring provided with means for clamping said rod.

3. The compensator according to claim 2, wherein a longitudinal axis of the clamping means is perpendicular to that of the rod.

4. The compensator according to claim 3, wherein the clamping means comprises a screw cooperating with said ring in order to grip said rod.

5. The compensator according to claim 1, wherein at least one pre-cutout is made in the rod substantially perpendicular to a longitudinal axis of the rod and for removing said elastic means and a redundant end of said rod after locking.

* * * * *